(12) United States Patent
Algüera

(10) Patent No.: US 7,731,215 B2
(45) Date of Patent: Jun. 8, 2010

(54) METHOD FOR THE TRANSMISSION OF ELECTRICAL PNEUMATIC OR HYDRAULIC ENERGY AND AN ENERGY TRANSMISSION SYSTEM

(75) Inventor: José Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 386 days.

(21) Appl. No.: 11/663,128

(22) PCT Filed: Sep. 3, 2005

(86) PCT No.: PCT/EP2005/009481

§ 371 (c)(1),
(2), (4) Date: Mar. 16, 2007

(87) PCT Pub. No.: WO2006/032355

PCT Pub. Date: Mar. 30, 2006

(65) Prior Publication Data

US 2008/0036175 A1    Feb. 14, 2008

(30) Foreign Application Priority Data

Sep. 23, 2004   (DE) .................... 10 2004 047 492

(51) Int. Cl.
*B60D 1/62* (2006.01)
*B60R 16/00* (2006.01)
(52) U.S. Cl. .................... 280/420; 280/421; 280/422
(58) Field of Classification Search .............. 280/420, 280/421, 422
See application file for complete search history.

(56) References Cited

U.S. PATENT DOCUMENTS

| 6,179,319 B1 * | 1/2001 | Malisch et al. | 280/477 |
| 2002/0000699 A1 * | 1/2002 | Ruddle | 280/5.5 |
| 2007/0176755 A1 * | 8/2007 | Fischer et al. | 340/10.34 |
| 2008/0129010 A1 * | 6/2008 | Alguera | 280/420 |

FOREIGN PATENT DOCUMENTS

| DE | 39 07 762 | 9/1990 |
| DE | 100 29 900 | 12/2001 |
| DE | 100 33 345 | 1/2002 |
| DE | 101 55 056 | 6/2003 |
| DE | 101 59 503 | 6/2003 |
| DE | 102 44 298 | 4/2004 |

* cited by examiner

*Primary Examiner*—Lesley Morris
*Assistant Examiner*—Marlon A Arce
(74) *Attorney, Agent, or Firm*—Hudak, Shunk & Farine Co. LPA

(57) ABSTRACT

A method for the transmission of electrical, pneumatic, or hydraulic energy between a first vehicle and a second vehicle, coupled thereto, for example a tractor vehicle and a trailer and an energy transmission system. The aim of the invention is development of a method and an energy transmission system permitting an operationally-secure driving condition over a long period even with a partly or completely damaged plug coupling system. Said aim is achieved by means of, amongst other things, a method whereby the energy in the energy distribution line is introduced from the energy supply line in a controlled manner.

18 Claims, 4 Drawing Sheets

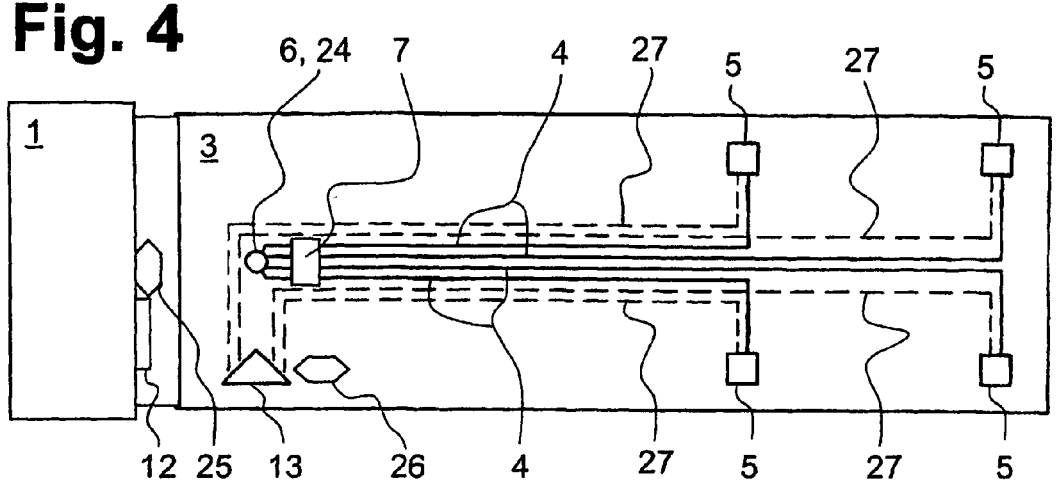
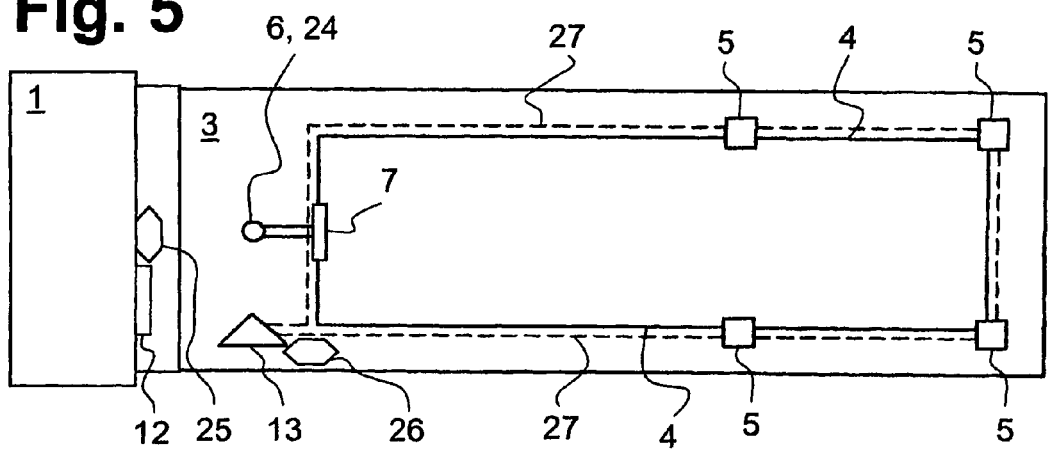
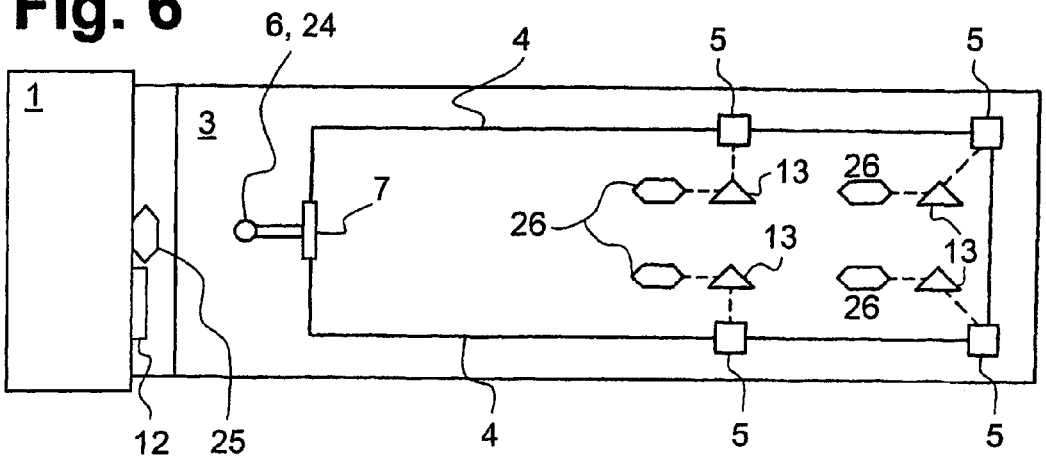

METHOD FOR THE TRANSMISSION OF ELECTRICAL PNEUMATIC OR HYDRAULIC ENERGY AND AN ENERGY TRANSMISSION SYSTEM

FIELD OF THE INVENTION

The invention concerns a method for transmitting of electric, pneumatic or hydraulic energy between a first vehicle and a second vehicle coupled to the former, for example, a tractor and a semitrailer. The invention is also implemented in an energy transmission system.

BACKGROUND OF THE INVENTION

Normally, the first and second vehicle are at first joined together mechanically via a coupling. By coupling is meant, for example, a fifth wheel, into which a king pin arranged at the trailer side is introduced via a wedgelike tapering entry opening and can be locked together with the fifth wheel. In older vehicles, the fixed supply lines installed on the first vehicle are then connected by the driver by hand to the second vehicle, making use of plug-in couplings. The supply lines include both pressurized air lines and current conducting cables, sometimes also hydraulic lines, and they are provided with energy from an energy supply trunk of the first vehicle. The energy supply trunk for pressurized air includes, for example, a compressor and a pressurized reservoir, and that for the electrical supply includes a generator and a storage battery. Also located on the trailer is an energy distribution trunk for the particular electric, pneumatic or hydraulic energy required.

This includes lines going to the individual consumers and sometimes also an energy storage device, especially when additional systems are hooked up on the trailer, such as refrigeration systems or a mobile fork lift truck. The energy storage device can also be configured as a storage battery or a pressurized reservoir.

To relieve the burden on the driver, there have already been efforts in the past to automate the connecting of the supply lines by means of specially configured plug-in coupling systems. One such plug-in coupling system is disclosed, for example, in DE 101 55 056 A1. Here, a wedgelike support element, in which a plug is arranged, can swivel and engage with the king pin of the trailer. During the coupling process, the wedgelike support element is oriented by the entry opening, which is complementary in form and also wedgelike, and it is secured laterally in the final locked position. In this form-fitting secured position, a movably mounted plug socket is extended from one side of the entry opening and engages with the plug located in the support element.

The invention is addressed to such plug-in coupling systems in which the connection of the plug-in coupling is accomplished without manual intervention of a person, since it is possible for a breakage or a major leak to occur at the plug-in coupling system during the driving on account of wear and tear or a mistake in operating the vehicle. Automated plug-in coupling systems are especially affected by this, due to vibrations and the relative motions which can occur when hooking up and unhooking the trailer, and also during the driving. Therefore, it is not always possible to ensure a reliable contacting and, thus, a trustworthy energy transmission. This may at times result in serious consequences.

For example, leakage of a pressurized air line could result in a sudden loss of pressurized air and the trailer would suddenly and unexpectedly undergo a complete braking.

Another prior art is disclosed by DE 39 07 762 A1 with a brake system for a tractor-trailer rig, wherein the brake system comprises a discharging circuit on the trailer and a charging circuit arranged on one of the two vehicles. The discharging circuit is formed by an energy storage in the form of a battery, a charging and discharging device connected in series with it, a control unit and valve units interacting with the latter, and the corresponding lines. The charging circuit comprises an energy source of the tractor, for example, a generator, the charging and discharging device, and the energy storage. During the braking process, relatively large currents flow through the lines of the discharge circuit, which can be designed relatively short on account of the near physical proximity of the energy storage to the control unit and therefore they produce only a slight voltage drop. The energy put out from the energy storage is made up during the nonbraking time by the electric energy source via the charging circuit. Since the nonbraking time is very much greater than the brake operation time, the energy storage can have its charge replenished with low currents over relatively long lines with little voltage drop.

SUMMARY OF THE INVENTION

Against this background, the problem of the invention was to develop a method and an energy transmission system enabling a still operational driving condition for a lengthy time when the plug-in coupling system is partly or entirely damaged.

The problem is solved according to the invention by a method in which the energy is supplied to the energy distribution trunk in regulated manner from the energy supply trunk.

The special feature of a regulated supply is the closed circuit. During the regulatory process, which occurs in an automatic control circuit, the regulated quantity, here, for example, a pressure or an electric voltage in the energy distribution trunk, is compared as the dependent variable to a predetermined control variable, here, for example, a minimum pressure or a minimum voltage, and automatically influenced so that it approaches this control variable. Deviations which occur are caused either by the action of a perturbing factor, here, for example, the escaping of pressurized air from the braking system or the transformation of electric energy into heat or mechanical work, or by a change in the control quantity, here, for example, and less commonly, the setting of a new minimum pressure or a new minimum voltage.

Thanks to the energy supply to the energy supply trunk, which has an energy storage device, the plug-in coupling system is only temporarily furnished with energy from the energy distribution trunk. This is only the case when the available energy in the energy distribution trunk falls below a previously defined minimum level. This is a substantial easing of the burden on the structural parts of the plug-in coupling system, since for most of the time there is no energy flow. If, however, a leak occurs, it is always possible to continue operating the consuming unit from the energy storage device in a safe manner for a certain amount of time, for example, up to the next rest stop or the next repair shop.

The method of the invention can be carried out preferably in a way so that the available energy in the energy distribution trunk is measured and compared to a given control variable, a setting signal is generated and transmitted to an actuator arranged at the energy distribution trunk. The actuator can be a switch in the case of electrical supply lines or a check valve in the case of pneumatic or hydraulic pressure lines.

The setting signal can be transmitted wirelessly or by wires via the plug-in coupling system. The transmission is also dependent on whether the plug-in coupling system is supposed to be connected permanently or temporarily. In the latter case, if the energy storage device is sufficiently full, the plug-in coupling system could be isolated and thus even further reduce the mechanical wear on the plug and socket. For this method, however, only a wireless transmission of the setting signal or the measurement signal is possible. This can occur, for example, by radio wave, infrared, or ultrasound.

The problem is also solved by an energy transmission system in which the energy supply trunk and the energy distribution trunk form an automatic control circuit.

For this, the energy distribution trunk can include a measuring instrument and the energy supply trunk an actuator, which receives a setting signal from a communication device connected to the measuring instrument. The measuring instrument provides a measurement signal in dependence on the available amount of energy and forwards this to the communication device. The communication device can be arranged on the first vehicle or the second vehicle.

In a configuration with the communication device arranged on the first vehicle, the measurement signal is transmitted from the second vehicle to the first vehicle, for example, in wireless manner or across wires, which can also be connected by the plug-in coupling system. On the other hand, when the communication device is arranged on the second vehicle, the setting signal is transmitted to the actuator in the above described manner.

The communication device will then always trigger a travel of the actuator into an open position when the measurement instrument measures a value lower than the predetermined control variable saved in memory in the communication device. After reaching an upper value, likewise able to be set in the communication device, the communication device will trigger a travel of the actuator to a closed position. In a wireless transmission of the setting signal, the actuator has a receiving unit tuned to the transmitting communication device.

It has also proven advisable to arrange a control unit on the first vehicle.

In a first preferred embodiment, the control unit can each time actuate the consumer directly via a control signal, or in a second alternative embodiment it can send the control signal to a centralized trailer control unit, arranged on the second vehicle, which then selectively controls the particular consumers.

The transmission of the control signal also advisedly occurs wirelessly or via the plug-in coupling system.

Most often, the plug-in coupling system comprises a socket arranged on the first vehicle and a plug arranged on the second vehicle. The plug and socket can preferably be joined permanently together. Such a plug-in coupling system can be constructed so that the socket is arranged stationary on the first vehicle and the plug is mounted on the second vehicle in such a way that a mechanical connecting or loosening of the plug-in coupling system occurs when the first and second vehicle are coupled or uncoupled. Alternatively to the permanent connection of plug and socket, these can also be temporarily connected. This will make possible a releasable connection of plug and socket, even though the first and second vehicle is mechanically coupled to each other. A sample layout of the energy transmission system could then have a movably mounted socket, provided with a drive device for moving the socket into or out from the plug.

BRIEF DESCRIPTION OF THE DRAWINGS

For a better understanding, the invention shall now be explained more closely by means of a total of 6 drawings. These show:

FIG. 4: a schematic top view of a first and second vehicle coupled together with an energy supply trunk branching off to each consumer and control lines;

FIG. 5: a view per FIG. 4 with an energy supply trunk as a ring line and a bus system, and FIG. 6: a view per FIGS. 4 and 5 with an energy supply trunk as a ring line, transmission units, and a trailer control unit at each consumer.

DETAILED DESCRIPTION OF THE INVENTION

Figure 1:
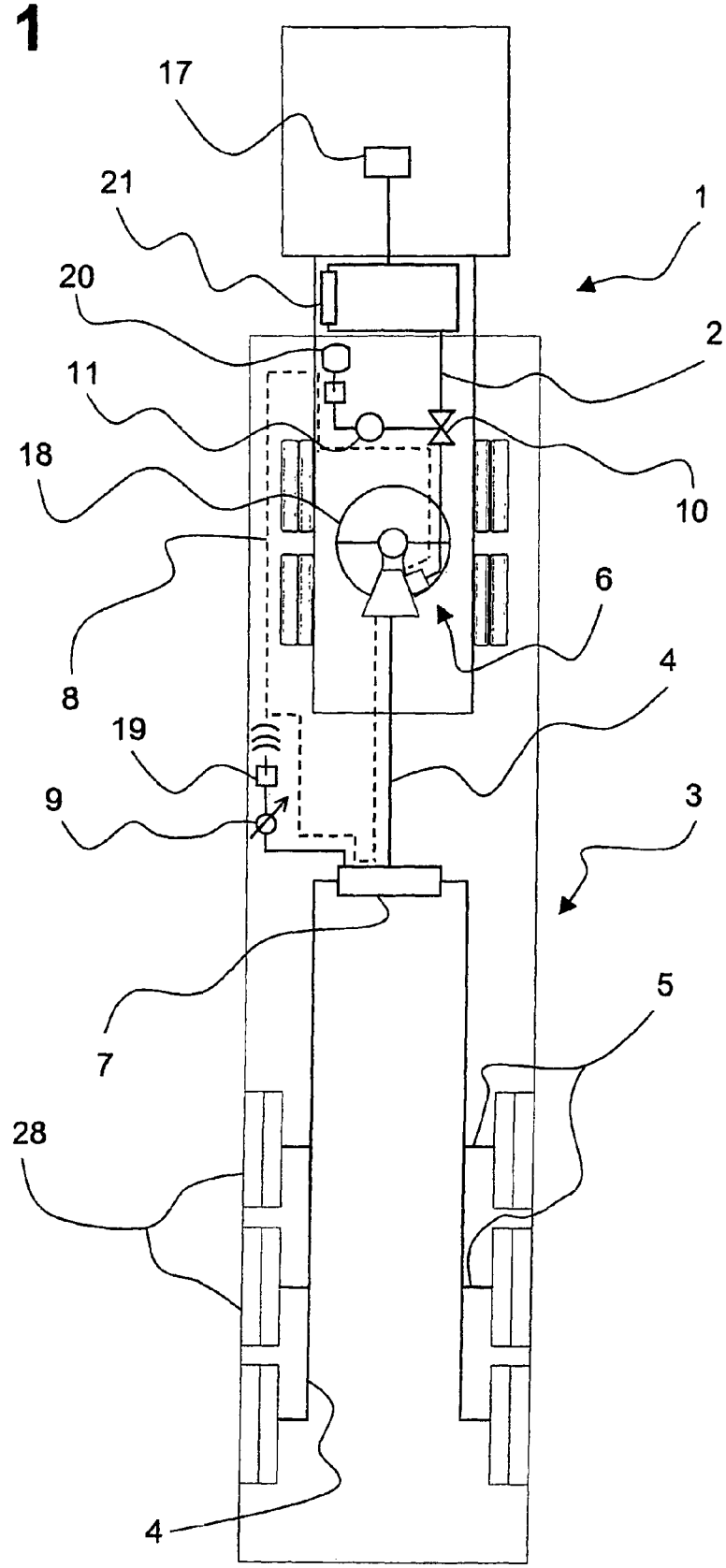
FIG. 1: a schematic top view of a first and second vehicle coupled together, with components of the energy transmission system.

FIG. 1 shows in a schematic top view a tractor trailer rig, comprising a tractor as the first vehicle 1 and a semitrailer as the second vehicle 3, coupled to the first vehicle 1 in familiar fashion by means of a fifth wheel 18.

On the first vehicle 1 is situated an energy supply trunk 2 and on the second vehicle 3 an energy distribution trunk 4, which together form the energy transmission system of the invention and are designed, for example, to furnish pressurized air. An energy transmission system to furnish electrical energy would be constructed similarly, but with different components familiar to the practitioner.

The energy supply trunk 2 is fed by a compressor 17 with pressurized air and supplies pressurized air to consumers of the first vehicle 1 in a circuit, not further shown. These consumers of the first vehicle include, for example, the pressurized brake system. The energy supply trunk 2 has a pressurized tank 21 to balance out the peak loads.

Figure 2:
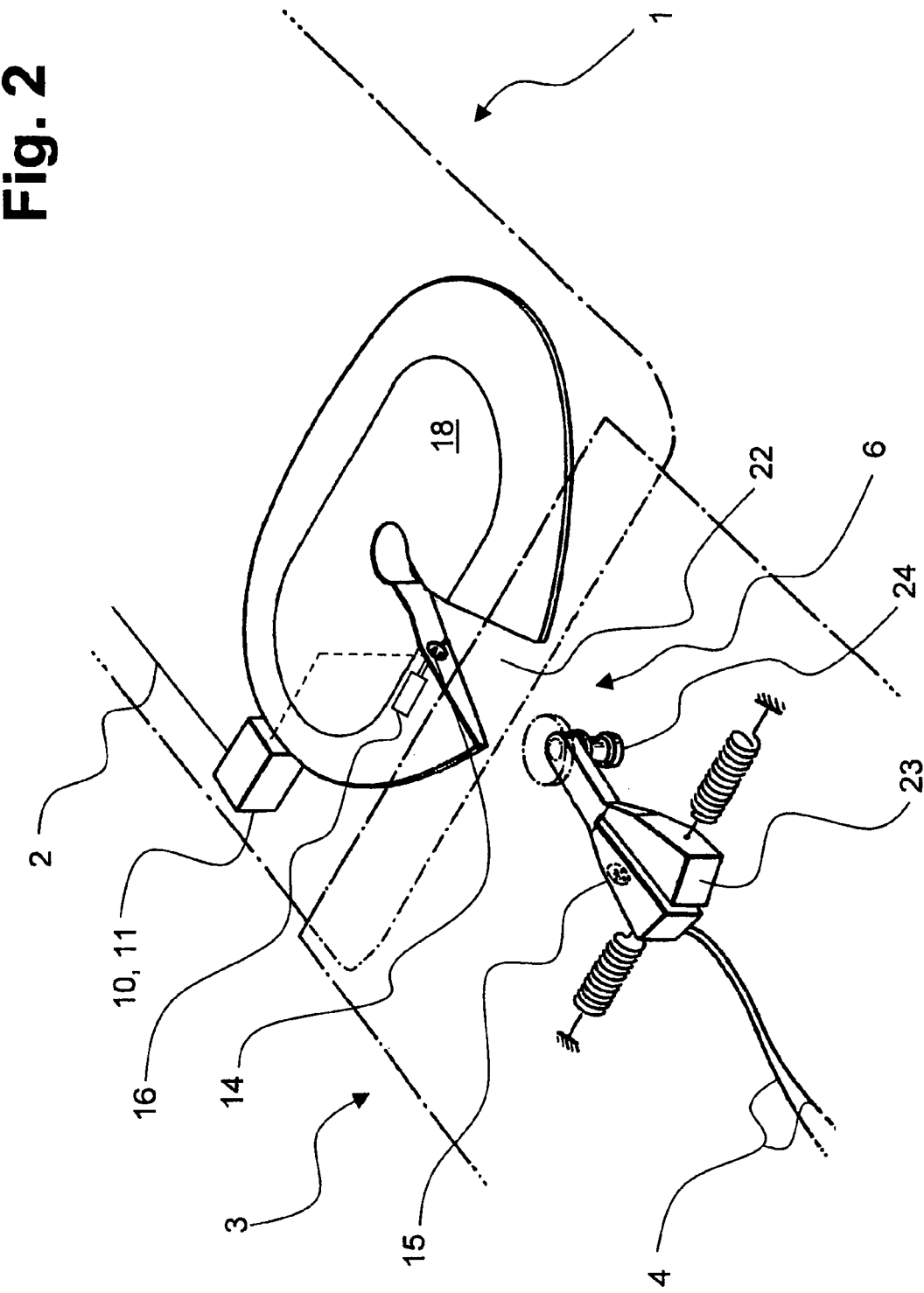
FIG. 2: a perspective view of a plug-in coupling system according to a first embodiment.
Figure 3:
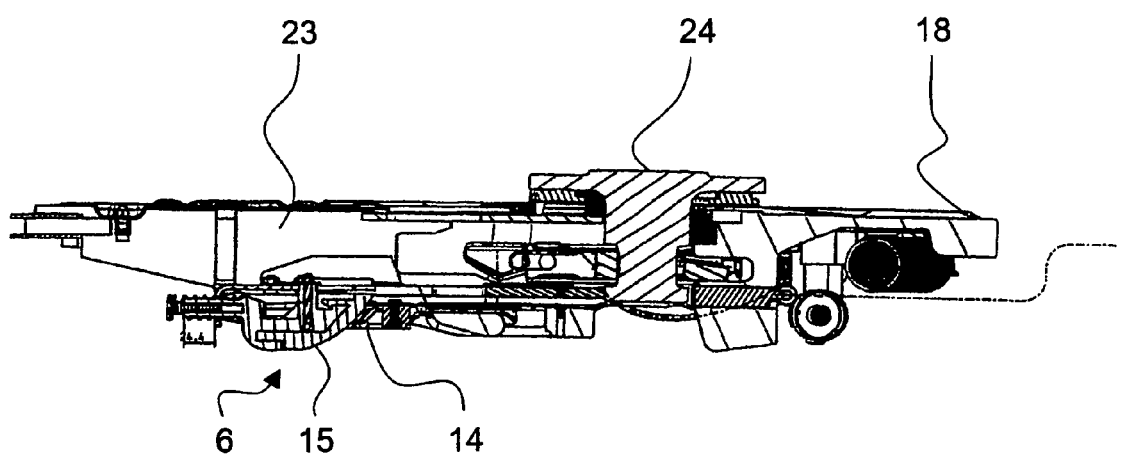
FIG. 3: a cross section through a plug-in coupling system according to a second embodiment.

The energy transmission system also includes a plug-in coupling system 6 described in further detail in FIGS. 2 and 3. The energy supply trunk 2 ends and the energy distribution trunk 4 of the second vehicle is engaged at the plug-in coupling system 6.

The energy distribution trunk 4 includes an energy storage device 7, which corresponds in its structural design largely to the pressurized tank 21 of the first vehicle 1. From the energy storage device 7, the energy distribution trunk 4 branches off to the respective consumers 5. The representation of FIG. 1 pertains to the pressurized air brakes at the wheels 28 of the second vehicle 3.

In driving operation, the energy distribution trunk 2 is fed with pressurized air via the energy supply trunk 2 by opening an actuator 10 arranged in the energy supply trunk 2, being a pressure-tight check valve in the present instance, and the energy storage device 7 is at first filled. In the case of an electrical energy supply, the actuator can be designed as a switch. The pressure prevailing in the energy distribution trunk 4 is measured via a measurement instrument 9 in the energy storage device 7 and the measurement signal is transmitted via a radio link from the transmitter 19 located on the second vehicle 3 to the receiver 20 arranged on the first vehicle 1. The receiver 20 then forwards the measurement signal to a communication device 11, in which the upper and lower pressure limits have been inserted as predetermined control variables. Upon reaching the predetermined upper pressure in the energy distribution trunk 4, a closing of the actuator 10 takes place by the communication device 11.

If the plug-in coupling system 6, which normally has a socket 14 and a plug 15, is outfitted with a movable socket 14 according to the embodiment shown in FIG. 2, after the closing of the actuator 10 it is possible to retract the socket 14 and mechanically isolate the plug-in coupling system 6.

Repeated brake operation occurs during the driving, along with a pressure loss in the energy distribution trunk 4, which is detected by the permanently metering measurement instrument 9 and the communication device 11 when it falls below a minimum lower pressure. To fill up the energy storage device 7, the socket 14 is driven into the plug 15 and the actuator 10 is opened.

In FIG. 1, the process wherein the pressure being regulated is constantly detected, compared to the predetermined pressure range in the communication device 11 and influenced so as to approach the pressure range, is depicted as automatic control circuit 8.

FIG. 2 shows, as an example, a fifth wheel 18 and a king pin 24 in a position ready for coupling; in the state when the king pin 24 is coupled in the fifth wheel 18, the support element 23 is received in the entry opening 22. For this, the support element 23 has a geometry adapted to the entry opening 22. The energy supply and also the transmission of control signals to the second vehicle 3 then occurs via the energy supply trunk 2, which makes use of an actuator 10 which is structurally combined with the communication device 11, to the socket 14. The socket 14 is then driven via a drive unit 16 into the plug, arranged stationary in the support element 23, thereby furnishing energy to the energy distribution trunk 4. The major benefit of this plug-in coupling system 6 is the possibility of retracting the socket 14 even while driving, as long as a sufficient energy amount is present in the energy storage device 7 arranged on the second vehicle 3. The disengaging of the plug-in coupling system 6 substantially increases the amount of wear on both the plug 15 and the socket 14.

Another possibility of making contact in a plug-in coupling system 6 is shown in cross section by FIG. 3. Here, a support element 23 can swivel and engage with the king pin 24, which carries the plug 15 on its lower end. During the coupling of the king pin 24 in the fifth wheel 18, the plug 15 impinges upon and engages with a socket 14 secured in stationary manner on the fifth wheel 18. The plug-in coupling system 6 of FIG. 3 uses no motor-driven components, but the king pin 24 engaged with the fifth wheel 18 cannot be disengaged. Even so, an interruption in the energy flow by an actuator 10 (see FIG. 1) provides for much less wear on the plug-in coupling system 6.

FIG. 4 shows a schematic top view of a first vehicle 1 and a vehicle 3 coupled to it, the energy distribution trunk 4 being furnished with energy via a plug-in coupling system 6 engaging with the king pin 24.

The energy distribution trunk 4 has an energy storage device 7, which in turn feeds the consumers 5. In this configuration, the control signals for actuating the consumers 5 are transmitted by a control unit 12 arranged on the first vehicle 1 and a first transmission unit 25 wirelessly to a second transmission unit located on the second vehicle 3 and from there to a trailer control unit 13. Each consumer 5 is actuated via its own control line 27. Thanks to the wireless transmission of the control signals, it is possible to open the plug-in coupling 6 when the energy supply device 7 is sufficiently charged.

In the embodiment per FIG. 5, on the other hand, the consumers 5 are connected in series to a ring-shaped energy distribution trunk 4. The actuating of the consumers 5 likewise occurs by a control unit 12, at first wirelessly up to a centralized trailer control unit 13 on the first vehicle 1 and from there via a bus system on a control line 27, likewise connected to all consumers in ring manner.

A third alternative is described in FIG. 6, where the energy distribution trunk 4 is designed in keeping with the embodiment of FIG. 5. However, the actuating of the consumers 5 occurs by special second transmission units 26 assigned to the respective consumers 5 and corresponding special trailer control units 13. Also in the embodiments of FIGS. 5 and 6 there is provided an interruption of the energy supply for a limited time by disengaging the plug-in coupling systems 6.

LIST OF REFERENCE NUMBERS 1 first vehicle
2 energy supply trunk
3 second vehicle
4 energy distribution trunk
5 consumer
6 plug-in coupling system
7 energy storage device
8 automatic control circuit
9 measurement instrument
10 actuator
11 communication device
12 control unit
13 trailer control unit
14 socket
15 plug
16 drive unit for socket
17 compressor
18 fifth wheel
19 transmitter
20 receiver
21 pressurized tank
22 entry opening of fifth wheel
23 support element
24 king pin
25 first transmission unit
26 second transmission unit
27 control line
28 wheels of trailer

The invention claimed is:

1. A method for transmitting electric, pneumatic or hydraulic energy between a first vehicle and a second vehicle coupled to the former, comprising the steps of: providing at least one energy supply trunk arranged on the first vehicle, providing at least one energy distribution trunk arranged on the second vehicle, wherein the energy distribution trunk
   is connected to consumers,
   is connected to the energy supply trunk via a plug-in coupling system,
   has an energy storage device and,
   feeding the energy in a regulated manner into the energy distribution trunk from the energy supply trunk, wherein the energy present in the energy distribution trunk is measured and compared to a predetermined control variable, a setting signal is generated and transmitted to an actuator arranged on the energy supply trunk.

2. The method per claim 1, wherein the setting signal is transmitted wirelessly or by wires via the plug-in coupling system.

3. The method per claim 1, wherein the plug-in coupling system is permanently connected.

4. The method per claim 1, wherein the plug-in coupling system is temporarily connected.

5. An energy transmission system for transmitting electric, pneumatic or hydraulic energy between a first vehicle and a second vehicle, comprising: at least one energy supply trunk arranged on the first vehicle and at least one energy distribution trunk arranged on the second vehicle, wherein the energy distribution trunk
- is connected to consumers,
- can be connected to the energy supply trunk via a plug-in coupling system,
- has an energy storage device, and
- wherein the energy supply trunk and the energy distribution trunk form an automatic control circuit, and wherein the energy distribution trunk includes a measuring instrument and the energy supply trunk an actuator, which receives a setting signal from a communication device connected to the measuring instrument.

6. The energy transmission system per claim 5, wherein a control unit is arranged on the first vehicle.

7. The energy transmission system per claim 6, wherein the control unit actuates the consumers via a control signal.

8. The energy transmission system per claim 6, wherein the control unit communicates via a control signal with a trailer control unit arranged on the second vehicle, which controls the consumers.

9. The energy transmission system per claim 7, wherein the transmission of the control signal occurs wirelessly or via the plug-in coupling system.

10. The energy transmission system per claim 5, wherein the plug-in coupling system has a socket arranged on the first vehicle and a plug arranged on the second vehicle.

11. The energy transmission system per claim 8, wherein the socket and the plug are permanently joined to each other.

12. The energy transmission system per claim 8, wherein the socket is arranged stationary on the first vehicle and the plug is mounted on the second vehicle in such a way that a mechanical joining or loosening of the plug-in coupling system occurs during the coupling and uncoupling of the first and second vehicles.

13. The energy transmission system per claim 8, wherein the socket and the plug are temporarily connected.

14. The energy transmission system per claim 11, wherein the socket is mounted so that it can shift and it is provided with a drive device for moving the socket into and out from the plug.

15. The energy transmission system per claim 1, wherein the setting signal is transmitted wirelessly or by wires via the plug-in coupling system, and wherein the plug-in coupling system is permanently connected.

16. The energy transmission system per claim 1, wherein the setting signal is transmitted wirelessly or by wires via the plug-in coupling system, and wherein the plug-in coupling system is temporarily connected.

17. The energy transmission system per claim 5, wherein a control unit is arranged on the first vehicle, wherein the control unit actuates the consumers via a control signal, and wherein the control unit communicates via a control signal with a trailer control unit arranged on the second vehicle, which controls the consumers.

18. The energy transmission system per claim 17, wherein the transmission of the control signal occurs wirelessly or via the plug-in coupling system, wherein the plug-in coupling system has a socket arranged on the first vehicle and a plug arranged on the second vehicle, wherein the socket and the plug are permanently joined to each other, and wherein the socket is arranged stationary on the first vehicle and the plug is mounted on the second vehicle in such a way that a mechanical joining or loosening of the plug-in coupling system occurs during the coupling and uncoupling of the first and second vehicles.

* * * * *